Aug. 18, 1959

J. L. MOLL 2,900,582

TRANSISTOR TEST SET

Filed Sept. 1, 1955

INVENTOR
J. L. MOLL
BY
Walter M. Hill
ATTORNEY

United States Patent Office

2,900,582
Patented Aug. 18, 1959

2,900,582

TRANSISTOR TEST SET

John L. Moll, New Providence, N.J., assignor to Bell Telephone Laboratories, Incorporated, New York, N.Y., a corporation of New York Application September 1, 1955, Serial No. 532,060

6 Claims. (Cl. 317—158)

This invention relates to the art of electrical measurement and more particularly to a method of and an apparatus for determining the large-signal alpha cut-off frequency of transistors.

In using transistors for switching purposes where relatively large signals are impressed thereon, a parameter known as the "large-signal alpha cut-off frequency" is useful information for design purposes. This parameter is discussed in an article entitled "Large-Signal Transient Response of Junction Transistors" by John L. Moll published in the Proceedings of the I.R.E., vol. 42, December 1954, pages 1773 to 1783.

It is the object of this invention to provide a relatively simple method of and an apparatus for determining the large-signal alpha cut-off frequency of transistors.

The foregoing object is achieved by this invention which contemplates passing a current pulse of relatively large and substantially constant amplitude through the base-emitter circuit and displaying the resulting collector transient current wave on an oscilloscope screen. The initial slope of this transient wave is a direct measure of the required cut-off frequency.

Figure 1:
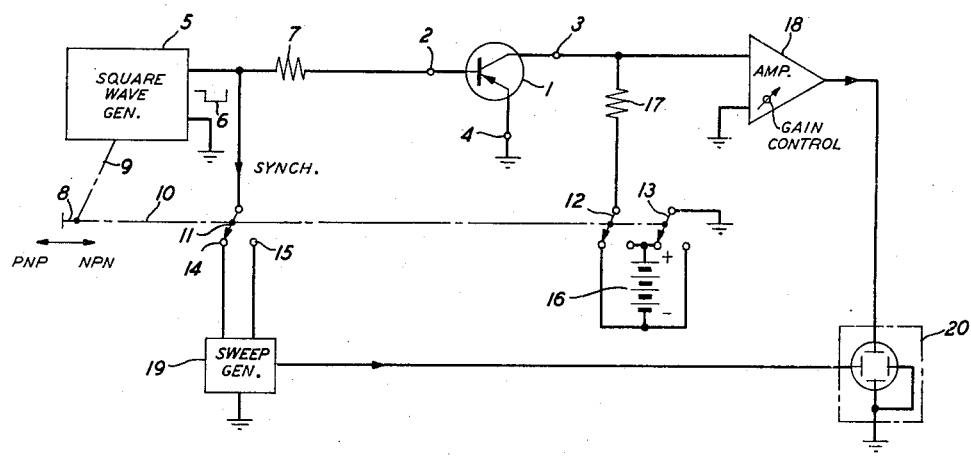
Figure 2:
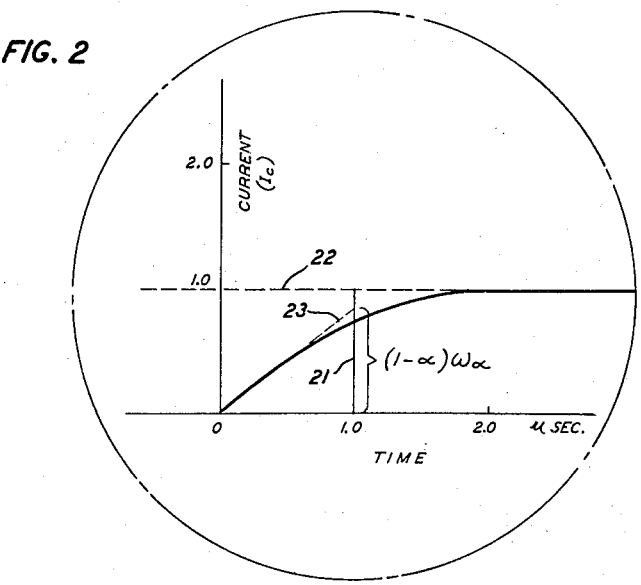

The invention may be better understood by reference to the accompanying drawing in which:

Fig. 1 is a schematic diagram of the preferred embodiment of this invention; and Fig. 2 discloses a typical oscillogram of the large-signal transient characteristic of the collector current.

With reference to Fig. 1, a transistor 1 to be tested is shown connected to test terminals 2, 3 and 4. The emitter is connected to the grounded test terminal 4, the base to test terminal 2 which receives the test signal and the collector is connected to test terminal 3 in the output circuit. The test signal is obtained from a conventional square wave generator 5 which may produce an output wave form of the character symbolized by the wave 6. The output voltage of this generator is impressed on the transistor test terminal 2 by way of a resistor 7 which is large relative to the emitter-base impedance of the transistor. The output current of the generator flowing through the emitter-base circuit of the transistor thus remains substantially constant and independent of transient impedance changes in the transistor. The resulting collector current responding to this signal is passed through a relatively small load resistor 17 which for ordinary transistors may be of the order of 100 ohms. This provides substantially short-circuit current amplification and renders the collector capacitance negligible. Resistor 17 connects the collector to a bias source 16 by way of a reversing switch comprising switch arms 12 and 13. Switch arm 12 is arranged to connect the resistor 17 to either the positive or negative terminal of the source 16 while switch arm 13 grounds the other terminal of source 16. The output voltage appearing across resistor 17 is of the same wave form as the collector current. This is impressed on the input circuit of an adjustable gain amplifier 18, the output of which is impressed upon the vertical deflector electrodes of a cathode ray oscilloscope 20.

At the instant that the square wave pulse 6 is impressed on the test circuit it also transmits a pulse through a synchronizing circuit to the sweep generator 19 by way of switch arm 11. This initiates the sweep operation of generator 19.

The symbolic representation of the transistor shown in Fig. 1 is that of the PNP type. For this type of transistor, the collector electrode must be negatively biased in order to be biased in its reverse direction. Hence the switch arms 12 and 13 are shown in a position to apply a negative bias to the collector electrode. Switch arm 11, which is ganged to arms 12 and 13 by way of switch link 10, is shown connected to switch point 14. In this position of switch arm 11, a negative going pulse from the square wave generator will initiate the sweep operation of generator 19.

Transistors used for switching purposes are to be switched from either their non-conducting states to their conducting states or vice versa. The amplitude of the signal is to be just sufficient to switch between the cut-off condition and the saturation condition. It is preferred that measurements in accordance with this invention be made by employing a signal which switches the transistor from its initial cut-off condition to its saturation condition. Although measurements can be made by switching in the reverse direction, this is not preferred. Hence, for testing PNP type transistors, it is preferred that the pulse from generator 5 be negative going so as to impress the signal between the emitter and base in their forward or conducting direction. Initially, the pulse may have just sufficient reverse polarity to definitely bias the transistor to its cut-off condition. Alternatively, the wave form 6 may be symmetrical with respect to ground, thus impressing equal voltage pulses in each direction.

When the transistor to be tested is of the NPN type, the signal impressed on the base-emitter circuit is preferably a positive going signal. At the same time the collector electrode must be biased positively in order to be biased in its reverse direction. Sweep generator 19 is of any conventional type but is made sensitive in a conventional manner to a pulse of only one polarity. In order to cause this generator to initiate a sweep on receiving a positive going pulse instead of the negative going pulse, switch arm 11 may be moved to switch point 15.

The operations described above are performed simultaneously by means of switch 8 which comprises the switch arms 11, 12 and 13 ganged together through the switch link 10 and a separate switch link 9 coupling switch 8 to a switch in the square wave generator which reverses the phase of the output square wave. As square wave generators and sweep generators capable of these reverse functions are well known in the art, further description thereof in this specification is unnecessary. It will be understood that as switch 8 is moved to the right to test NPN type transistors, switch link 9 causes the square wave generator 5 to produce positive going square wave pulses, switch arm 11 is moved to point 15 thus causing sweep generator 19 to initiate the sweep on receiving a positive going pulse and switch arms 12 and 13 cooperate to apply a positive bias from source 16 to the collector electrode. The resulting operation is otherwise identical with that already described for the PNP type transistor with the switch in the position shown in Fig. 1. When the pulse 6 is symmetrical to ground, as described above, the switch link 9 is unnecessary.

The type of oscillogram which will be observed on the screen of oscilloscope 20 is shown in Fig. 2. For convenience, the zero axes have been depressed to the lower left side of the screen. The sweep axis is calibrated in time units which may conveniently be in microseconds. The vertical axis is the collector current axis and may be calibrated in any arbitrary units. This transient curve may be defined by the following mathematical expression:

$$I_c = A[1 - \epsilon^{-(1-\alpha)\omega_a t}]$$

where $I_c$ is the instantaneous collector current at any time $t$ after receiving the signal square wave pulse, A is the maximum value of the collector current after a long time has elapsed, $\epsilon$ is the base of the natural system of logarithms, $\alpha$ is the large-signal alpha of the transistor and $$\omega_a = 2\pi f_a$$

where $f_a$ is the large-signal alpha cut-off frequency of the transistor.

It will be evident that the collector current $I_c$ asymptotically approaches the limiting value A. By suitably adjusting the gain control of amplifier 18, the asymptote can be adjusted to any arbitrary scale and for convenience in the practice of the invention it is made equal to unity on the collector current scale of the oscilloscope. Referring to Fig. 2 it will be noted that the transient curve has been adjusted so that it approaches the asymptote 22 which coincides with a current of unit magnitude. By differentiating the expression given above for the collector current with respect to time, it will be found that the initial slope of this curve is equal to $(1-\alpha)\omega_a$. If an ordinate 21 be drawn normal to the time axis at unit time, the tangent 23 to the initial portion of the transient curve will intersect ordinate 21 at a point corresponding in magnitude to the initial slope of the transient curve. This is indicated on the oscillogram of Fig. 2. Vertical line 21 may be calibrated as decimal fractions of unity and hence the initial slope may be read directly from the oscillogram.

By knowing the large-signal alpha of the transistor, which is determined by other laboratory means, the value read from the oscillogram for the initial slope of the curve may be immediately translated into the required large-signal alpha cut-off frequency. It is evident from the expressions given above that the large-signal alpha cut-off frequency is directly proportional to this value of slope read off line 21 of the oscillogram.

From the foregoing description, it will be evident that the invention embraces both a method of and an apparatus for very rapidly and easily determining the large-signal alpha cut-off frequency of transistors.

What is claimed is:

1. The method of determining the large-signal alpha cut-off frequency of a transistor having base, emitter and collector electrodes comprising passing a substantially square wave current pulse of predetermined amplitude between the base and the emitter electrodes, producing an oscillogram of the resulting collector current as a function of time, and constructing a tangent to the initial portion of said oscillogram passing through the intersection of said oscillogram with the current axis, the slope of said tangent being a measure of the large-signal alpha cut-off frequency.

2. The method of determining the large-signal alpha cut-off frequency of a transistor having base, emitter and collector electrodes comprising passing a square wave current pulse of a predetermined large-signal amplitude and polarity through the circuit path between the base and the emitter electrodes, producing an oscillogram of the resulting collector current as a function of time, and constructing a tangent to the initial portion of said oscillogram passing through the intersection of said oscillogram with the current axis, the slope of said tangent being a measure of the large-signal alpha cut-off frequency.

3. The method of determining the large-signal alpha cut-off frequency of a transistor having base, emitter and collector electrodes comprising suddenly passing a substantially constant large-signal current in the forward direction through the circuit path between the base and the emitter electrodes, producing an oscillogram of the resulting collector current as a function of time, and constructing a tangent to the initial portion of said oscillogram passing through the intersection of said oscillogram with the current axis, the slope of said tangent being a measure of the large-signal alpha cut-off frequency.

4. Means for determining the large-signal alpha cut-off frequency of a transistor having base, emitter and collector electrodes comprising means connected to the base and emitter electrodes for passing a substantially square wave large-signal current pulse through the base and emitter circuit, and means connected to the collector circuit for producing an oscillogram of the resulting collector current transient as a function of time.

5. The combination of claim 4 and a scale on said last-named means calibrated in percent of maximum collector current.

6. Means for determining the large-signal alpha cut-off frequency of a transistor having base, emitter and collector electrodes comprising three test terminals for connection to said electrodes, a pulse generator for producing a substantially square wave large-signal current pulse, means connecting said generator in series with the test terminals for connection to said base and emitter electrodes, an oscillograph having vertical and horizontal deflection means, means connecting the third test terminal for the collector electrode to the vertical deflection means to produce a vertical deflection proportional to the collector current, and sweep producing means connected to said pulse generator and to said horizontal deflection means operable in synchronism with the said vertical deflection means.

References Cited in the file of this patent

"An Alpha Plotter for Point Contact Transistors." T. P. Sylvan. "Electrical Engineering" December 1954, pp. 1094–1097.

"Journal of Applied Physics" (Spitzer et al.) vol. 26, No. 4, April 1955, pp. 414–417.